Jan. 29, 1963 A. TEPLITZ 3,075,421
SAMPLING PUNCH FOR CONTINUOUS STRIP PROCESSING LINES
Filed July 15, 1959 9 Sheets-Sheet 2

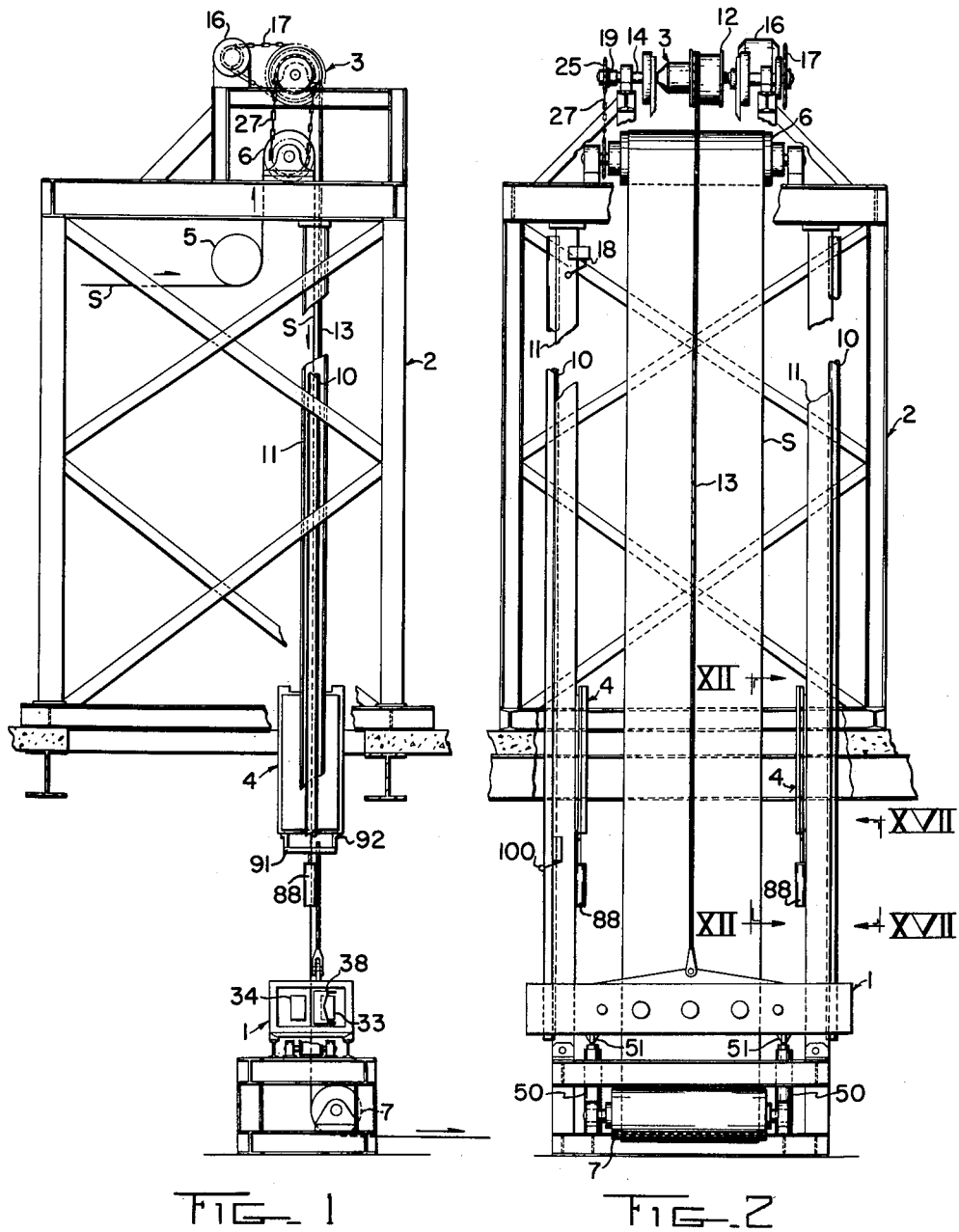

INVENTOR
ALFRED TEPLITZ
By Donald G. Dalton
Attorney

Jan. 29, 1963   A. TEPLITZ   3,075,421
SAMPLING PUNCH FOR CONTINUOUS STRIP PROCESSING LINES
Filed July 15, 1959   9 Sheets-Sheet 3

INVENTOR
ALFRED TEPLITZ
By Donald G. Dalton
Attorney

Jan. 29, 1963  A. TEPLITZ  3,075,421
SAMPLING PUNCH FOR CONTINUOUS STRIP PROCESSING LINES
Filed July 15, 1959  9 Sheets-Sheet 4
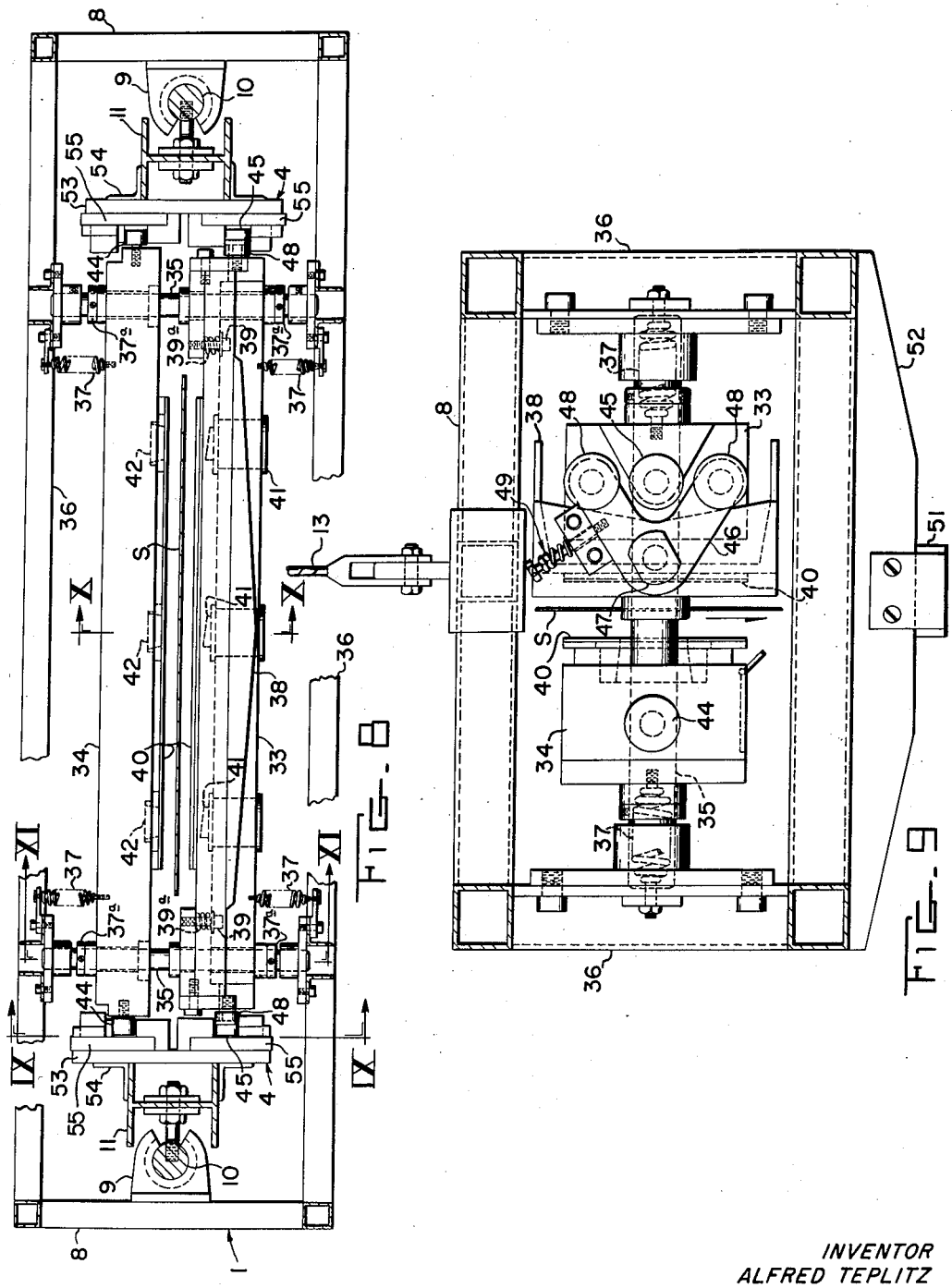
INVENTOR
ALFRED TEPLITZ
By Donald G. Dalton
Attorney

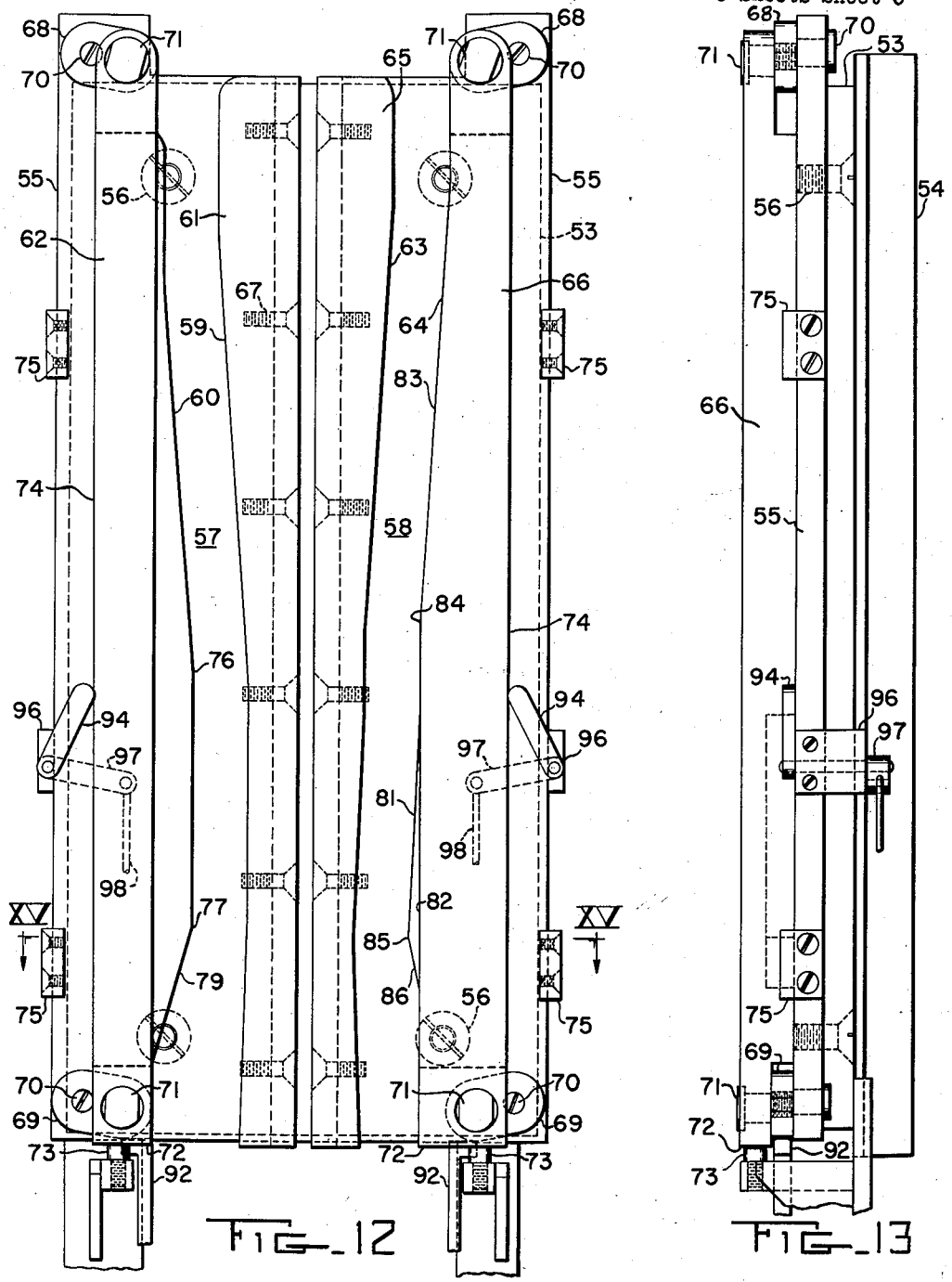

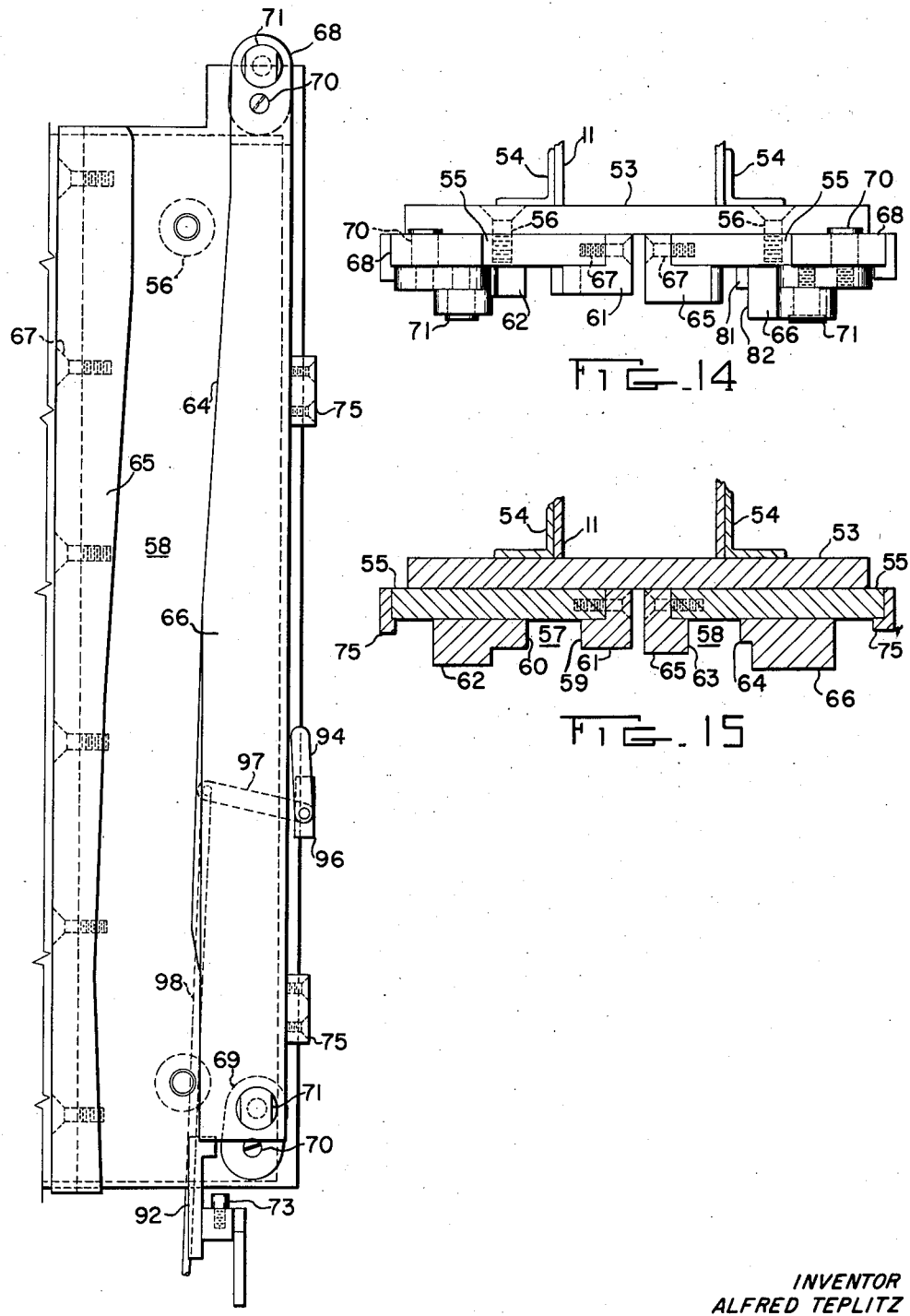

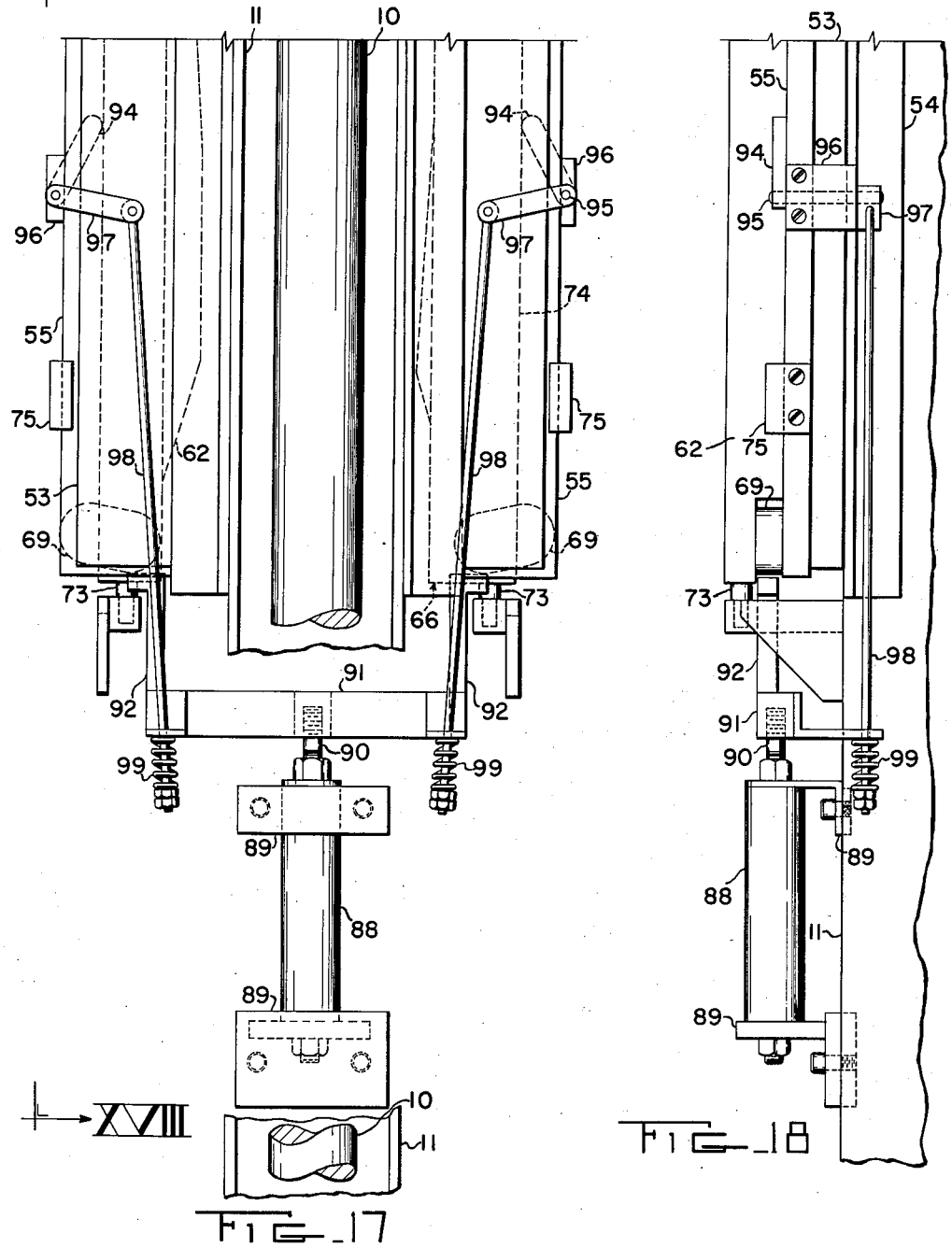

Jan. 29, 1963  A. TEPLITZ  3,075,421
SAMPLING PUNCH FOR CONTINUOUS STRIP PROCESSING LINES
Filed July 15, 1959  9 Sheets-Sheet 9
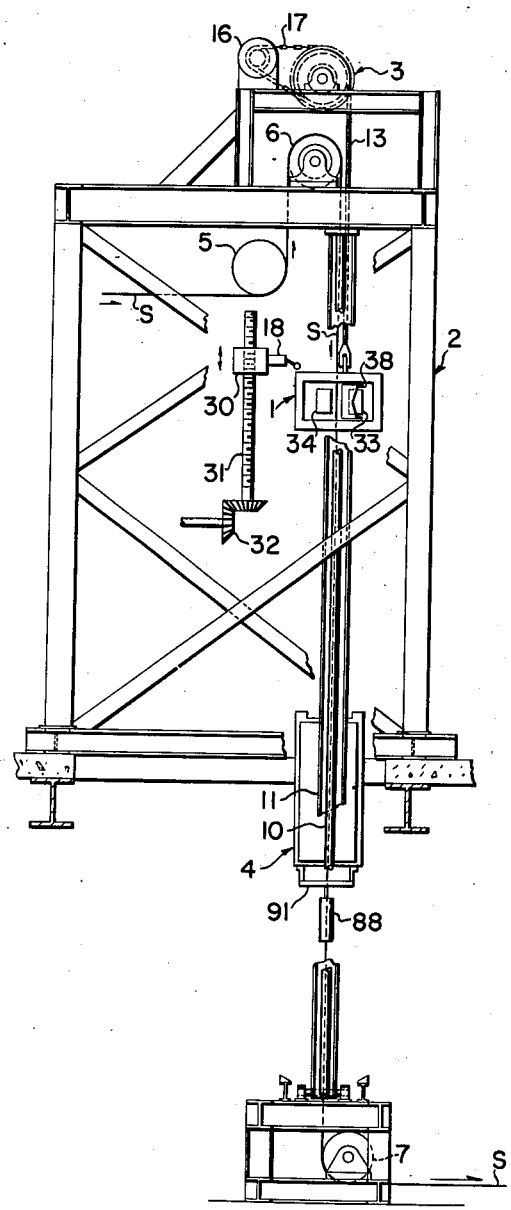
FIG_19
INVENTOR
ALFRED TEPLITZ
By Donald G. Dalton
Attorney

United States Patent Office 3,075,421
Patented Jan. 29, 1963

3,075,421
SAMPLING PUNCH FOR CONTINUOUS STRIP PROCESSING LINES
Alfred Teplitz, Pittsburgh, Pa., assignor to United States Steel Corporation, a corporation of New Jersey
Filed July 15, 1959, Ser. No. 827,287
14 Claims. (Cl. 83—311)

This invention relates to an apparatus for taking samples from continuous metal strip while it is travelling through a processing line.

Quality-control in the manufacture of tin plate as well as other sheet metal strip products requires that samples be taken frequently for testing in the mill metallurgical laboratories. If the product is sheared into sheets, sampling is easily accomplished by periodically removing sheets from the conveyor belt following the shear. However, if the product is produced in coil form, samples can be readily obtained only from the ends of the coil and such samples, moreover, may not be accurately representative of the product in other portions of the coil. For the purpose of quality control it is highly desirable that samples should be taken from the strip at points other than its ends. Stopping of the line to obtain samples from the body of the coil is impractical since this would interfere with the strip processing operation and render portions of the strip, for example, those portions in plating tanks during the stoppage, of unsuitable quality.

One of the principal objects of this invention, accordingly, is to provide an apparatus that can be operated to obtain samples from strip as it travels through a processing line and which does not require stoppage or slowing of the strip movement. In a preferred embodiment of such apparatus, the strip has its movement guided over a vertical path that extends through a punch carriage, which is mounted for gravitational acceleration along said path from an elevated position at its upper end. The desired sample is removed from the strip by a punch and die that are arranged on opposite sides of the strip and are mounted on the punch carriage for movement between retracted and punching positions relative to each other and the strip. When the downward movement of the punch carriage is accelerated to a speed that is synchronized with the speed of strip travel in a manner to be described, the punch and die are actuated by camming units that are arranged in the path of downward movement of the punch carriage.

In order that the strip will not be mutilated by tearing or the formation of burrs about the holes formed by punching samples from the strip, there must be no relative movement between the strip and the punch when the punch is operated to remove the sample, and this requires precise speed synchronization of the punch carriage with the speed of strip travel, and a punching operation that is performed while such speeds are synchronized. In this respect, the preferred embodiment of this invention includes a hoist for raising the punch carriage to an elevated position from which it is released for gravitational movement in the direction of strip travel, speed synchronizing means, a clamping mechanism for securing the punch carriage to the strip during its downward movement, and a camming mechanism that operates to perform the punching operation, which are respectively designed and operated to obtain synchronized speed of punch carriage and strip movement and to thus enable punching a sample without damage to the strip. Such hoist, speed synchronizing means, clamping and camming mechanisms involve inventions which are covered in copending Robert A. Schultz applications Serial No. 829,-379 and Serial No. 829,380, both filed July 24, 1959, and Serial No. 837,418, filed September 1, 1959.

Other objects and advantages of the invention will become apparent from the following description and the accompanying drawings in which:

FIGURE 1 is an elevational view of a strip sampling apparatus constructed in accordance with the principles of this invention;

FIGURE 2 is an elevational view looking from the right of FIGURE 1;

FIGURE 8 is an enlarged plan view showing the punch-frame assembly in a vertical position above the camming units that effect a strip punching operation thereof, and which is taken looking in the direction of the line VIII—VIII of FIGURE 3;

FIGURE 9 is an enlarged view taken along the line IX—IX of FIGURE 8 which shows the operating parts of the punch-frame assembly in end elevation;

FIGURE 12 is an elevation of one of the camming units looking in the direction of the line XII—XII of FIGURE 2;

FIGURE 13 is a side elevation of the camming unit shown in the FIGURE 12;

FIGURE 14 is a plan view of the camming unit shown in FIGURE 12, and FIGURE 15 is a sectional view taken along the line XV—XV thereof;

FIGURE 16 is a fragmentary elevational view similar to FIGURE 12 of a portion of the camming unit but showing the operating parts thereof in a different position;

FIGURE 17 is a fragmentary elevational view looking in the direction of the line XVII—XVII of FIGURE 2 which shows the air-cylinder operated mechanism that controls the operating positions of the movable parts of one of the camming units;

FIGURE 18 is an elevation looking in the direction of the line XVIII—XVIII of FIGURE 17; and FIGURE 19 is a fragmentary elevational view similar to FIGURE 1 which shows an alternative and modified form of the invention.

Figure 3:
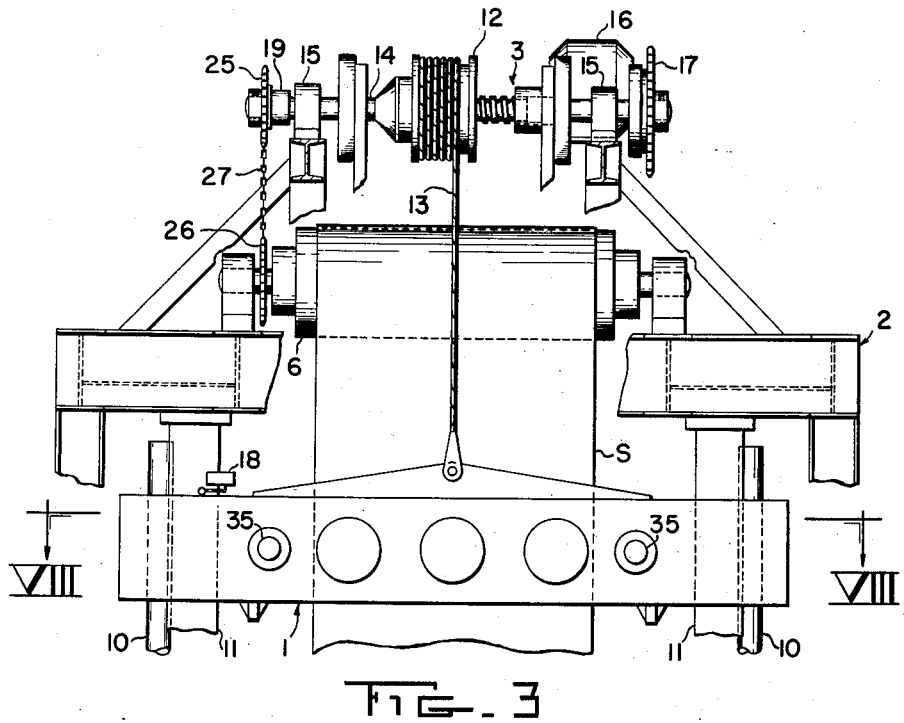
FIGURE 3 is an enlarged fragmentary elevational view of a portion of the apparatus shown in FIGURE 2 which shows the punch-frame assembly thereof in an elevated position.
Figure 4:
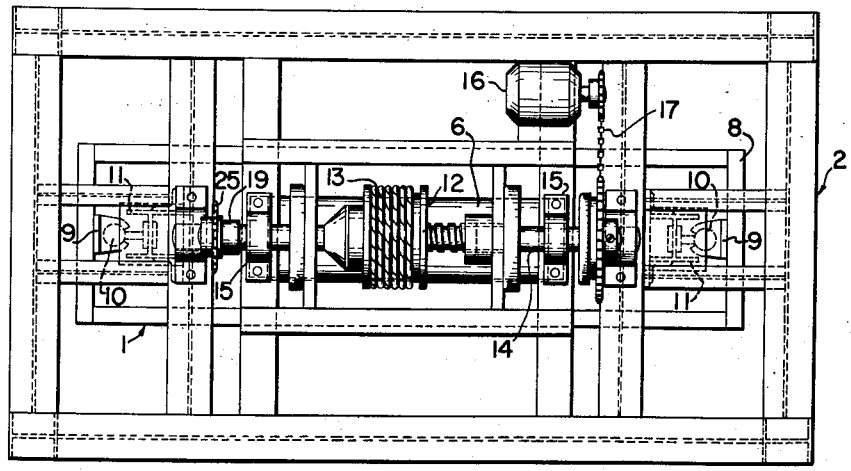
FIGURE 4 is a plan view of the structure shown in FIGURE 3.
Figure 5:
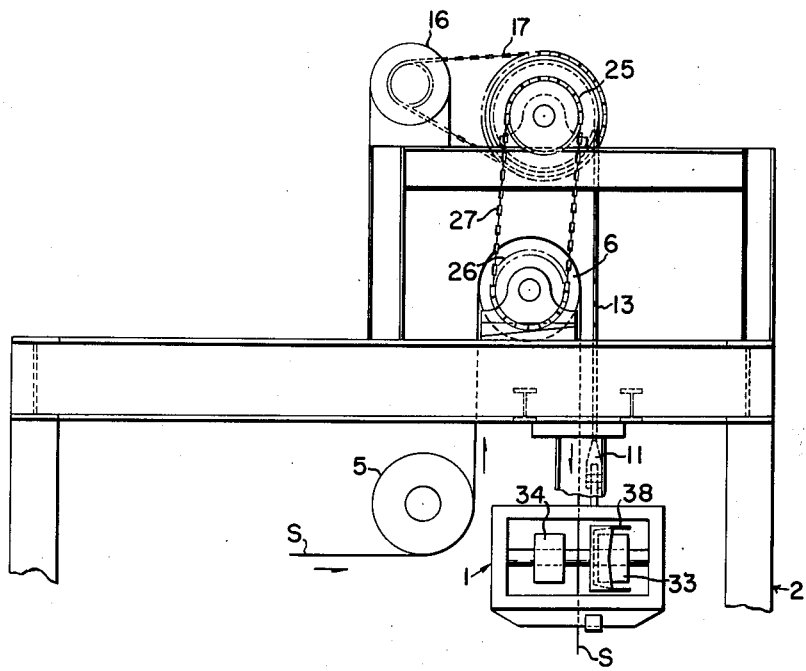
FIGURE 5 is an elevational view looking from the left of FIGURE 3.

Generally stated, and as shown in FIGURES 1–5, the strip punching apparatus of this invention comprises a punch-frame assembly 1 which is mounted for vertical movement with respect to a frame 2 that forms part of a conventional strip conveyor for delivering strip continuously through a processing line, a hoist unit 3 that controls the raising and lowering movements of the assembly 1, and a pair of camming units 4 respectively arranged in the path of vertical movement of opposite ends of the assembly 1 for operating it to effect a strip punching operation. The strip S travels continuously over guide rolls 5, 6 and 7, which are arranged in the strip conveyor and are mounted on the conveyor frame 2, and moves downwardly over a vertical path between the guide rolls 6 and 7 that extends through the punch assembly 1. To effect a strip punching operation, the hoist unit 3 is operated to elevate the punch-frame assembly 1 from its lowered position, shown in FIGURES 1 and 2, to its elevated position, shown in FIGURE 3, where it is released for gravitational downward movement in the direction of strip travel between the guide rolls 6 and 7. As the assembly 1 moves downwardly, the camming units 4 operate punch and die devices, which in a manner to be described form part of the assembly 1 and are respectively positioned on opposite sides of the strip S, to effect a strip punching operation. In order that the strip will not be torn or mutilated when the punching operation is effected, the assembly 1 must have a downward speed, when it is opposite the camming units 4 and a strip punching operation is effected thereby, that exactly matches the speed of travel of the strip S. Synchronization of the speed of movement of the assembly 1 and the strip S is essential in order that there will be no relative vertical movement between the strip and the punch and die parts of the assembly 1 when they operate to punch a sample from the strip S. While the speed synchronization of the assembly 1 relative to the strip S is preferably effected through an over-running clutch forming a part of the unit 3, this may be accomplished by controlling the vertical position from which the assembly 1 is released for downward movement according to the modification of the invention shown in FIGURE 19 of the drawings.

The assembly 1, as best shown in FIGURE 8, comprises a carriage in the form of a rectangular frame 8 which has its vertical movement guided by guide collars 9 extending inwardly from opposite ends thereof. The collars 9 have sliding engagement on vertical guide rods 10 that have bolted connections with vertical standards 11, which as best shown in FIGURE 2, are arranged along opposite edges of the vertical path of movement of the strip S and form part of the frame 2. The camming units 4 are secured in facing relation along the inner sides of the standards 11 as shown in FIGURE 2.

As indicated above, raising and lowering movement of the frame assembly 1 is controlled by the hoist unit 3, which includes (see FIGURE 3) a winding drum 12 for a hoist cable 13 connected at its lower end to the punch-frame carriage 8. The drum 12 is mounted for rotation by a shaft 14 which is supported in bearings 15 and is driven by an electric hoist motor 16 through a sprocket chain drive 17. Upon operation of the motor 16, the drum 12 is rotated to wind the cable 13 thereon and raise the punch-frame assembly 1 to the elevated position shown in FIGURE 3. As the assembly 1 moves into this position, a limit switch 18, which controls rotation of the drum 12 by the shaft 14, is actuated to discontinue the upward movement of the assembly 1 and release it for gravitational movement downwardly over the guide rods 10. The hoist unit 3 further includes mechanism providing for axial cable threading movement of the drum 12 to maintain the cable 13 centered with respect to the assembly 1 which forms the subject matter of the above mentioned co-pending application of Robert A. Schultz, Serial No. 837,418, and to which reference is made for a detailed description thereof. While the drum 12 in the preferred construction of the unit 3 is connected and released with respect to the drive shaft 14 through magnetic clutches (not shown), the drive shaft 14 can be regarded for the purpose of this invention as being continuous through the bearings 15 and the drum 12 as having a keyed connection thereto such that raising and lowering movement of the assembly 1 is controlled by the energized condition of the motor 16. In this respect, it will be understood that the limit switch 18 can be regarded as controlling the energization of the motor 16 and, more particularly, as operating to de-energize it to release the drum 12 for a gravitational lowering movement of the assembly 1.

Figures 6, 7:
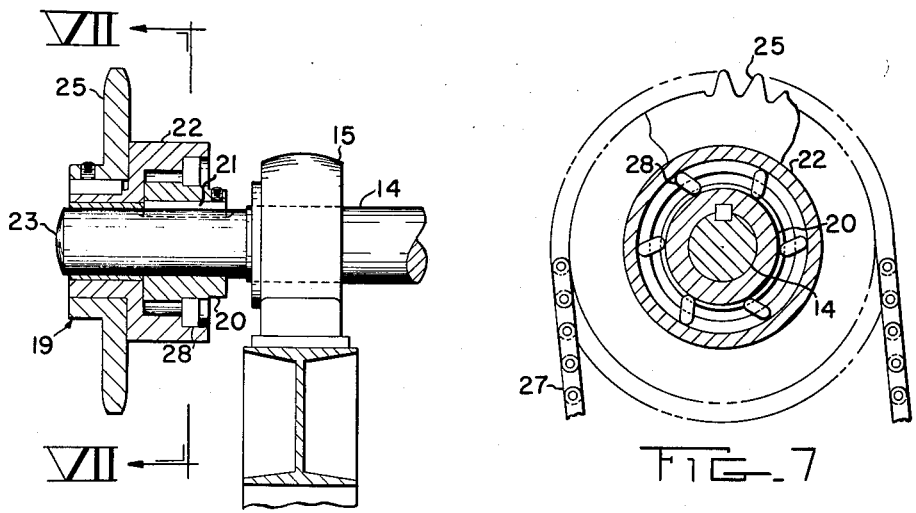
FIGURE 6 is a fragmentary vertical sectional view showing somewhat diagrammatically an over-running clutch that forms part of the drive for controlling the vertical movement of the punch-frame assembly shown in the preceding figures.
FIGURE 7 is a fragmentary sectional view taken substantially in the plane of the line VII—VII of FIGURE 6.

As further indicated above, the downward speed of travel of the assembly 1 must be synchronized with the speed of strip travel when its punch and die parts (to be described) are operated by the camming units 4. The speed synchronization for this purpose is preferably accomplished through an over-running clutch 19 that forms part of the hoist unit 3 and the subject-matter of the above mentioned co-pending application by Robert A. Schultz, Serial No. 829,379. The clutch 19 is conventional and is illustrated somewhat diagrammatically in FIGURES 6 and 7 of the drawings as comprising an inner race 20 connected by a key 21 to the shaft 14, and an outer race 22 supported for rotation on the outer end 23 of the shaft 14. The outer race 22 is rotated continuously in a counterclockwise direction, as viewed in FIGURE 7, by a chain and sprocket drive which includes a sprocket 25 keyed to the outer race 22, a sprocket 26 connected with the strip guide roll 6 for rotation therewith, and a sprocket-chain 27 connecting the sprockets 25 and 26. Since the guide roll 6 has frictional engagement with the strip S and is thus driven at a speed corresponding to the linear speed of strip movement, the outer race 22 is continuously driven at a rotational speed corresponding to the linear speed of strip travel. The over-running feature of the clutch 19 is provided by clutch wedges or sprags 28 between the inner race 20 and the outer race 22 which operate to prevent rotation of the inner race 20 in a counterclockwise direction, as viewed in FIGURE 7, at a rotational speed greater than the rotational speed of the outer race 22. In this manner, the over-running clutch 19 provides for unrestricted relative rotation of the inner race 20 and shaft 14 in a clockwise direction as viewed in FIGURE 7, to permit elevation of the frame assembly 1, and to permit its downward acceleration by gravity to a speed corresponding to the speed of strip travel. When the assembly and strip speeds are matched, the clutch sprags 28 operate to lock the inner race 20 to the outer race 22 and prevent the inner race 20 from over-running the outer race 22 so that further increase in the speed of downward movement of the assembly 1 is prevented. For this purpose, the unit 3 must be constructed to provide for locking operation of the sprags 28 at the instant when the strip speed and peripheral speed of the drum 12 are the same. The vertical elevation from which the assembly 1 is dropped by actuation of the limit switch 18 must be sufficiently high that the assembly 1 is accelerated to a speed matching the strip speed prior to its movement to the level of the camming units 4. When the assembly 1 reaches the speed at which the strip S is travelling, the clutch 19 operates through the sprags 28 as explained to prevent further increase in speed of the assembly 1.

From the foregoing it will be apparent that the over-running clutch 19 operates to synchronize the downward movement of the assembly 1 with the strip S, and that this is accomplished at different speeds of strip travel. In this respect, it will be noted that for slow speeds of strip movement the sprags 28 operate to lock the inner and outer races 20 and 22 against relative movement at an early point in the downward movement of the assembly 1, while for higher strip speeds the sprags 28 operate at a later point in the downward movement of the assembly 1. Attention is particularly directed to the fact that the speed synchronizing action of the clutch 19 enables a stationary location of the limit switch 18 so that the punch-frame assembly 1 is released for downward movement at a fixed elevation for all speeds of strip travel, and the switch 18 may thus be attached to one of the standards 11 in the position shown in FIGURE 2.

The drive shown in FIGURE 19 omits the clutch 19 from the hoist unit 3, and provides for release of the assembly 1 for lowering movement at vertical levels that vary with and are determined by the speed of strip travel. This arrangement requires that the limit switch 18 be moved to a vertical position corresponding to the speed of strip travel such that the distance between the camming units 4 and the point at which the assembly 1 is released by actuation of the limit switch 18 will provide for its gravitatonal acceleraton to the speed of strip travel at the point when it is moving through the camming units 4 and is operated to effect a strip punching operation. The adjustable mounting of the limit switch 18 for this purpose comprises a collar 30 threaded on a shaft 31 which is connected at its lower end to a gear train 32. The gear train 32 is preferably driven by an annularly controlled electric motor drive (not shown) and effects rotation of the shaft 31 to thereby adjust the vertical position of the collar 30 and limit switch 18. The collar 30 is operated to raise the limit switch 18 for higher strip speeds and to lower the switch 18 for slower strip speeds. This requires that the speed of strip travel be known so that the height from which the assembly must drop can be calculated.

Figure 10:
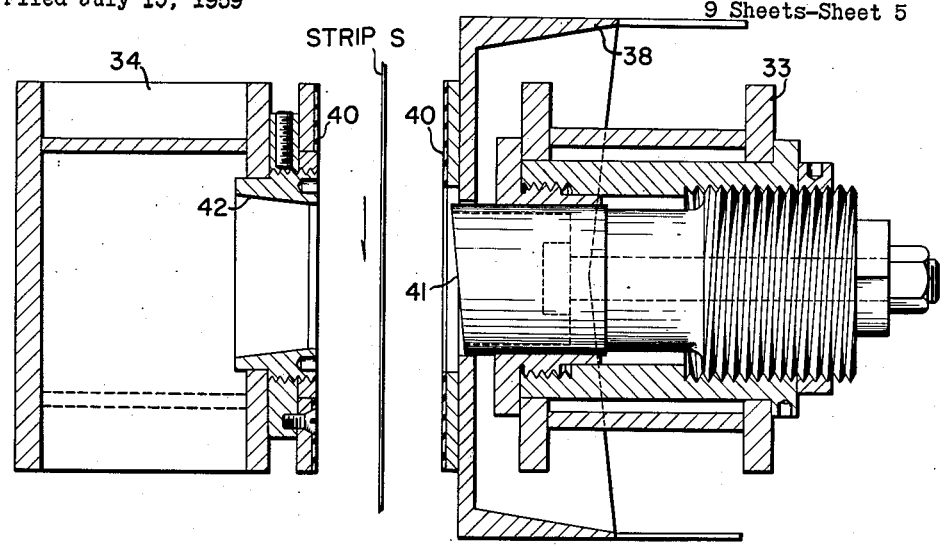
FIGURES 10 and 11 are enlarged sectional views respectively taken along the lines X—X and XI—XI of FIGURE 8.
Figure 11:
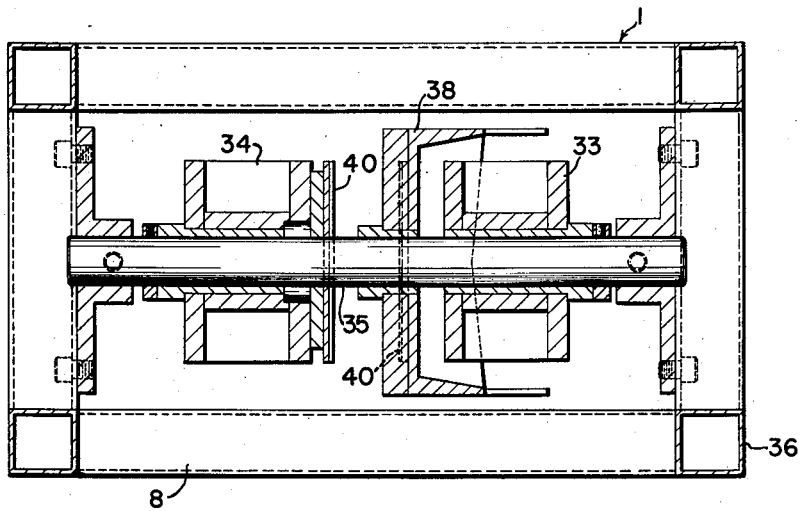

The punch-frame assembly 1, as indicated, has punch and die parts on opposite sides of the strip S for punching samples therefrom. For this purpose, and as shown in FIGURES 8–11, such punch and die parts comprise a punch-frame 33 and a die-frame 34 respectively arranged on opposite sides of the strip S. A pair of rods 35 extending transversely of opposite sides 36 of the assembly 1 support the frames 33 and 34 for rectilinear sliding movement in a direction normal to the path of strip travel to and from a strip punching position relative to each other. Each of the frames 33 and 34 is held by a pair of coil springs 37 (shown diagrammatically in FIGURE 8) against stop collars 37a on the shafts 35. In addition, a stripper-frame 38 is mounted for rectilinear sliding movement on the rods 35 in a position between the punch-frame 33 and the strip S as best shown in FIGURES 10 and 11. A pair of stop bolts 39 limits the movement of the stripper-frame relative to the punch-frame 33 in a direction toward the die-frame 34 as viewed in FIGURE 8, and a pair of coil springs 39a (see FIGURE 8) biases the movement of the stripper-frame 38 on the rods 35 in a direction away from the punch-frame 33 and toward the strip S to the limited position determined by the stop bolts 39. A pair of clamping plates 40 are respectively mounted in facing relation on the stripper-frame 38 and die-frame 34 for clamping engagement with the strip S in a manner to be described. The punch-frame 33 mounts a plurality of punches 41 for movement through aligned openings in cooperating dies 42 on the die-frame 34 and in the clamping plates 40. Upon movement of the frames 33 and 34 toward each other in a manner to be described, the clamping plates 40 first move into clamping engagement with the strip S and immediately thereafter the punches 41 enter the dies 42 to punch samples from the strip S. The frames 33 and 34 are preferably provided with three sets of punches 41 and dies 42 so that on each punching operation three samples, respectively at the center and opposite edges of the strip, are obtained.

Punching movement of the frames 33 and 34 toward each other as described above is effected by cam followers at opposite ends of the frames 33, 34 and 38 which are actuated by the camming units 4 in a manner to be described. For this purpose, the cam followers are cam rollers 44 on opposite ends of the die-frame 34 and similar cam rollers 45 on opposite ends of the punch-frame 33. The mechanism for operating the stripper-frame 38 comprises a pair of bell-crank assemblies secured to opposite ends thereof which respectively comprise a bell-crank 46 having a central pivotal connection 47 to an end of the frame 38 and a pair of cam followers or rollers 48 rotatably supported on the outer ends of the arms of the bell-crank 46. As best shown in FIGURE 9, a spring assembly 49 biases each of the bell-cranks 46 to a position in which the cam rollers 48 thereof are aligned vertically relative to the cam roll 45 on the punch-frame 33. The cam rollers 48 however (see FIGURE 8) are spaced axially inwardly relative to the punch-frame cam rolls 45 for a purpose to be described.

In operation, the stripper-frame 38 and die-frame 34 are actuated to move the clamping plates 40 into clamping engagement with the strip S in advance of actuation of the punch-frame 33. The clamping action of the plates 40 is thus effective to prevent relative movement between the strip S and the punch-frame assembly 1 at the time the punches 41 are operated to remove samples from the strip S. In this manner the clamping plates 40 prevent relative movement of the strip S with respect to the punch-frame assembly 1 if their relative speeds of movement are not exactly synchronized at the time when the assembly 1 moves through the camming units 4 and the strip punching operation is performed.

The punch-frame assembly 1, with particular reference to the structure thereof that provides for cam actuation of the frames 33, 34 and 38, and the specific construction of the camming units 4 form the subject-matter of the remaining Robert A. Schultz application, Serial No. 829,381.

A pair of shock absorbers 50 supported on the base of frame 2 stop the downward movement of the carriage 1 when it reaches the position shown in FIGURE 2. The shock absorbers 50 are engaged by a pair of bumpers 51 which are secured to bracing members 52 extending transversely between the sides of the carriage 8 as shown in FIGURE 9.

It will be recalled that the camming units 4 are attached to the vertical standards 11 in facing relation relative to each other. For this purpose, and as shown in FIGURES 8 and 14, each of the units 4 includes a back plate 53 which is secured by a pair of angles 54 to one of the frame standards 11. The units 4 have an identical construction which, as shown in FIGURES 12–15, includes a pair of mounting plates 55 secured in laterally spaced relation to the back plate 53. While the mounting plates 55 preferably have an adjustable support on the back plate 53 in order to provide for adjustment of the position of camming mechanism (to be described) mounted thereon, they may be regarded for the purposes of this invention as being rigidly attached to the back plate 53, for example, by threaded fasteners 56.

The camming mechanism supported on the mounting plates 55 provides a pair of vertically extending cam slots 57 and 58, as best shown in FIGURE 12, through which the cam rollers 44, 45 and 48 travel as the punch-frame assembly 1 moves downwardly from the drop position shown in FIGURE 3 to the position shown in FIGURE 2. The cam slot 57 is defined by facing surfaces 59 and 60 respectively on a vertically extending bar 61 secured to one of the mounting plates 55 and a cam bar 62 mounted for sliding movement over the face thereof. The other cam slot 58 is similarly defined by facing surfaces 63 and 64 respectively on a vertically extending bar 65 secured to the other mounting plate 55 and a cam bar 66 mounted for sliding movement over the face thereof. The bars 61 and 65 have L-shaped configurations as best shown in FIGURES 14 and 15 and are rigidly secured to adjacent edges of the plates 55 by threaded fasteners 67. The mountings of the movable bars 62 and 66 are identical and as best shown in FIGURES 12 and 13 respectively comprise a pair of upper and lower parallel links 68 and 69, the bars 62 and 66 having recesses on their back surfaces to provide space in which the links 68 and 69 are received. The outer ends of each of the links 68 and 69 are connected by pivots 70 to the mounting plates 55, and their inner ends are connected by pivots 71 to the bars 62 and 66, the upper links 68 being connected to the upper ends of the bars 62 and 66, and the lower links 69 being connected to the lower ends thereof.

FIGURE 12 shows the bars 62 and 66 in their lowered and operative positions in which their respective camming surfaces 60 and 64 cooperate with the stationary camming surfaces 59 and 63 to form the cam slots 57 and 58 for a purpose to be described. FIGURE 16 shows the bar 66 in its retracted position to which it is moved when the assembly 1 is to be elevated to the position shown in FIGURE 3 for a purpose to be described. Both of the bars 62 and 66 are moved simultaneously to and from their operating and retracting positions by the mechanism (to be described) shown in FIGURES 17 and 18. In the operating position of the bars 62 and 66 shown in FIGURES 12 and 13, their lower ends 72 engage stationary stop pins 73. In their retracted positions, their outer edges 74 as shown in FIGURE 16 move into abutting engagement with stops 75 secured to the outer edges of the mounting plates 55.

The cam slots 57 provide passageways through which the cam rollers 44 at the ends of the die-frame 34 travel during upward and downward movement of the assembly 1 relative to the camming units 4. Upon downward movement through the slots 57, the rollers 44 have camming engagement with the vertically inclined upper portions of the camming surfaces 60 which operate to cam the die-frame 34 from the retracted position shown in FIGURE 8 to a position in which its clamping plate 40 has engagement with the strip S. The frame 34 is held in this position while the rollers 44 move downwardly over the vertical portions of the camming surfaces 60 between the points 76 and 77. Below the points 77, the surfaces 79 have a reverse inclination that provides for retracting movement of the die-frame 34, which is effected by the camming action of the lower end portions of the surfaces 59 that are opposite and below the points 77, and by the biasing springs 37.

The cam slots 58 similarly provide passageways through which the punch-frame rollers 45 and the stripper-frame rollers 48 travel during upward and downward movement of the punch-frame assembly 1. In order to provide for inward punching movement of the punch-frame 33 relative to the stripper-frame 38, each cam surface 64 has a portion 81 adjacent its lower end which is spaced inwardly (see FIGURE 14) with respect to the portion 82 thereof to provide for independent actuation of the cam rollers 45 and 48, which it will be recalled are spaced axially relative to each other. During downward movement of the assembly 1, the punch-frame rollers 45 move over the surfaces 81 while the stripper-frame rollers 48 move over the surfaces 82. During initial downward movement over the inclined upper portions 83 of the cam surfaces 64, the stripper-frame rollers 48 and the punch-frame rollers 45 are both cammed inwardly to move the punch-frame 33 and the stripper-frame 38 toward the strip S. As its downward movement continues the stripper-frame 38 is cammed to a position in which its clamping plate 40 has clamping engagement with the strip S when both of its rollers 48 have engagement with the portions 82, which are vertical, of the camming surfaces 64, and at this point the cam-rollers 44 of the die-frame 34 will be opposite the points 76 so that both clamping plates 40 will have tight clamping engagement with the strip S, which will thus be held against relative movement with respect to the frames 33 and 34 during a subsequent punching operation of the punch-frame 33. Attention is directed to the fact that each bell-crank lever 46 has a pivotal movement as the rollers 48 at the outer ends of its arms move over the points 84 at the upper ends of the vertical portions 82 of the camming surfaces 64. The bell-crank levers 46 thus provide for application of the camming force to the stripper-frame 38 at a central point when it is operated to move its clamping plate 40 into engagement with the strip S. As downward movement of the assembly 1 is continued, the punch-frame rollers 45 move over the inclined camming surfaces 81 and operate to move the punch-frame 33 inwardly to force the punches 41 into the dies 42 and thus punch samples from the strip S while it is held between the clamping plates 40. The punching throw of the frame 33 is completed slightly before the rollers 45 move to a position opposite the points 85, but this involves only a small travel of the punches 41 in the nature of 1/16 inch. The surfaces 86 below the points 85 have a reverse inclination to provide for retracting movement of the frame 33 by its biasing springs 37, which movement is effected initially by the camming action of the inclined lower end portions of the surfaces 63 that are opposite and below the points 85. While initial retracting movement of the punch-frame is taking place in this manner, engagement of the stripper-frame rollers 48 with the vertical camming surfaces 82 is maintained to hold the stripper-frame 38 against outward movement with the punch-frame 33. In this manner, the punches 41 are stripped from the strip S by the action of the stripper-frame 38 operating through its clamping plate 40 to hold the strip S against outward movement with the punches 41.

As indicated, FIGURE 12 shows the operating positions of the cam bars 62 and 66 relative to the stationary cam bars 61 and 65, and FIGURE 16 illustrates the retracted position of the bar 66 relative to the stationary cam bar 65. When the cam bar 65 is retracted as shown in FIGURE 16, the other cam bar 62 occupies a similar retracted position. In the retracted positions of the cam bars 62 and 66, their camming surfaces 60 and 64 are arranged outwardly relative to the camming surfaces on the stationary bars 61 and 65 and occupy positions in which they are inoperative to effect a strip-punching operation of the assembly 1 during upward movement to the position shown in FIGURE 3. As shown in FIGURES 17 and 18 the mechanism for moving the cam bars 62 and 66 to and from their operating and retracted positions comprises a double-acting reversible air cylinder or motor 88 which is supported on the vertical standards 11 by brackets 89. The motor 88 includes a vertically extending piston rod 90 connected at its upper end to a horizontally extending yoke 91 that has a pair of cam operating members 92 projecting upwardly from opposite ends thereof. The upper ends of the members 92 have abutting engagement with the pivot links 69 so that they are effective, when moved upwardly by the motor 88 from the retracted position shown in FIGURES 17 and 18, to move the cam bars 62 and 66 upwardly from the position shown in FIGURE 12. By reason of the pivotal mounting provided by the parallel links 68 and 69 upward movement of the cam bars 62 and 66 in this manner results in their movement to the retracted position in FIGURE 16.

In order that retracting or return movement of the piston rod 90 by the motor 88 will be effective to lower the cam bars 62 and 66 to their respective operating positions shown in FIGURE 12, the yoke 91 is connected with the cam bars 62 and 66 through a link system which includes a pair of links 94 that resiliently biases their respective movements. Each of the links 94 has abutting engagement at its upper end with the outer edge 74 of one of the cam bars 62 or 66 as shown in FIGURE 12 and has its lower end keyed to a pin 95 rotatably supported in a bearing block 96 secured to the outer edge of a mounting plate 55. The pivotal movement of each pin 95 and biasing link 94 is controlled by a lever 97 which extends inwardly over the back of the mounting plate 53 and has one end keyed to the pivot pin 95 and its other end pivotally connected to a vertically extending operating rod 98. The rods 98 extend downwardly through openings in the piston connected yoke 91 and have springs 99 on their lower ends which bias their movement downwardly with respect to the yoke 91 to thereby maintain the outer ends of the links 94 engaged with the edges 74 of the cam bars 62 and 66. In this manner, the springs 99 provide a resilient bias that operates through the links 94 to move the cam bars 62 and 66 inwardly toward the operating position shown in FIGURE 12.

When the yoke 91 and piston 90 to move to the retracted position shown in FIGURES 17 and 18, the links 94 engage and move the cam bars 62 and 66 to the operating position shown in FIGURE 12. Upon operation of the motor 88 to move the piston rod 90 and yoke 91 upwardly, the members 92 as described above operate to pivot the lower links 69 and to move the cam bars 62 and 66 to their retracted positions. As the cam bars 62 and 66 move outwardly to their retracted positions, the links 94 are pivoted outwardly relative to each other as viewed in FIGURE 17 and thus operate to rotate the levers 97 to the position shown in dotted lines in FIGURE 16, and this carries the rods 98 upwardly with the yoke 91 so that tension on the springs 99 is maintained. Upon reverse operation of the motor 88 to return the piston 90 and yoke 91 to the position shown in FIGURE 17, the yoke 91 moves downwardly and compresses the biasing springs 99, which operate to move the rods 98 downwardly. Downward movement of the rods 98 in this manner is effective through the levers 97 and pins 95 to pivot the links 94 in opposite rotational directions and toward each other to thereby move the cam bars 62 and 66 inwardly to the operating positions thereof shown in FIGURE 12.

As indicated, the motor 88 is a double-acting air cylinder and is controlled by a solenoid-actuated reversing valve (not shown), which in turn is controlled by the upper limit switch 18 and a lower limit switch 100 (see FIGURE 2) mounted on one of the standards 11 at a vertical level just below the camming units 4 and in the path of movement of the assembly 1 for operation thereby. Since solenoid operated reversing valves and control circuits therefor are conventional, the reversing valve circuit controlling the operation of the motor 88 has not been shown in the drawings, and it will be sufficient to indicate that such circuit is under the control of the limit switches 18 and 100. The limit switch 100 operates upon downward movement of the assembly 1 to effect operation of the motor 88 in one direction to move the yoke 91 upwardly and thereby move the cam bars 62 and 66 to their retracted positions. When the hoist unit 3 is thereafter energized to elevate the assembly 1, the cam bars 62 and 66 are in their retracted positions and the cam follower rolls 44, 45 and 48 move upwardly through the cam slots 57 and 58 without effecting a strip punching operation of the punch-dies 41 and 42. When the assembly 1 moves into the upper position shown in FIGURE 3, the limit switch 18 operates to release the assembly 1 for downward gravitational movement as described above. In addition, the limit switch 18 includes contacts in the control circuit for the motor 88 which are effective upon operation to reverse the operation of the motor 88 to return the cam bars 62 and 66 to their operative camming positions shown in FIGURE 12. The control circuit for the motor 16 preferably provides for release of the assembly 1 for lowering movement only after the cam bars 62 and 66 are returned to their operating positions as shown in FIGURE 12, and this may be accomplished by interlock contacts (not shown) which are actuated when the bars 62 and 66 engage the stop pins 72. As the assembly 1 gravitates downwardly, its cam follower rolls move through the cam slots 57 and 58 and effect a strip-punching operation of the punch 41 and die 42 as described above.

While the carriage 8 of the punch-frame assembly 1 is mounted for vertical movement in the preferred embodiment of the invention as described above, and thus utilizes gravity for accelerating its speed to the speed of strip movement, it will be understood that the principles of this invention are applicable to modifications in which, for example, the punch-frame carriage 8 is mounted for horizontal movement and has a power drive for accelerating its speed to the speed of strip travel.

While one embodiment of my invention has been shown and described it will be apparent that other adaptations and modifications may be made without departing from the scope of the following claims.

I claim:

1. A punch for taking samples from strip travelling continuously over a vertical path comprising, a carriage, means mounting said carriage for gravitational movement along said path from an elevated position to a lowered position, a strip punching mechanism mounted on said carriage for movement therewith, and means for actuating said punching mechanism to remove a sample from said strip when said carriage is accelerated by gravitational lowering movement from said elevated position to a speed coresponding to the speed of strip movement.

2. A punch for taking samples from strip travelling continuously over a vertical path comprising, a carriage, means mounting said carriage for gravitational movement along said path from an elevated position to a lowered position, a punch and a die respectively disposed on opposite sides of said path of strip travel and mounted on said carriage for movement in a direction transversely of said path between retracted and strip punching positions relative to each other on said carriage, and means for actuating said punch and die from their said retracted position to said punching position when said carriage is accelerated by gravitational lowering movement from said elevated position to a speed corresponding to the speed of strip movement.

3. The punch defined in claim 2 characterized by said punch and die actuating means comprising an operating means mounted in a position spaced a predetermined distance below said elevated position, said distance being sufficient to provide for gravitational acceleration of said carriage to the speed of strip travel before actuation of said punch and die by said actuating means.

4. A strip punch as defined in claim 3 characterized by a power hoist for elevating said carriage, and means for adjusting the position to which said carriage is elevated by said hoist to thereby vary the said distance through which it gravitates prior to actuatiaon of said punch and die by said actuating means.

5. A punch for taking samples from strip travelling continuously over a vertical path comprising, a carriage, means mounting said carriage for gravitational movement along said path from an elevated position to a lowered position, a stop for arresting the downward movement of said frame in said lowered position, a strip punching mechanism mounted on said carriage for movement therewith, means responsive to gravitational movement to a predetermined position between said elevated and lowered positions for operating said strip punching mechanism, and control means regulating the speed of carriage movement and operating to provide a downward speed thereof that matches the speed of strip movement at the time when it reaches said predetermined position.

6. A strip punch as defined in claim 5 characterized by a hoist for elevating said carriage, and by said speed control means comprising means for adjusting the said elevated position to which said carriage is elevated by said hoist to thereby vary the distance between said elevated position and said predetermined position through which said carriage gravitates prior to actuation of said strip punching mechanism.

7. A punch for taking samples from strip travelling continuously over a vertical path comprising, a carriage, means mounting said carriage for gravitational movement along said path, a hoist for raising said carriage to an elevated position including means for releasing it for gravitational downward movement therefrom, a stop for arresting the downward movement of said carriage in a lowered position, a strip punching mechanism mounted on said carriage for movement therewith, and means for actuating said punching mechanism to remove a sample from said strip when said carriage is accelerated by gravitational lowering movement from said elevated position to a speed corresponding to the speed of strip movement.

8. A punch for taking samples from strip travelling continuously over a vertical path comprising, a carriage, means mounting said carriage for gravitational movement along said path, a hoist for raising said carriage to an elevated position including means for releasing it for gravitational downward movement therefrom, a stop for arresting the downward movement of said carriage in a lowered position, a punch and a die respectively disposed on opposite sides of said path of strip travel and mounted on said carriage for movement in a direction transversely of said path between retracted and punching positions relative to said strip, said punch and die normally occupying a retracted position relative to each other on said carriage, means for actuating said punch and die to their said strip punching position in response to downward movement of said carriage to a predetermined position between said elevated and lowered position, and means for operating said releasing means to control the said elevated position to which said carriage is hoisted and released, said control means and hoist releasing means operating to release said carriage from an elevated position such that its speed of travel matches the speed of strip movement when it reaches said predetermined position.

9. A punch for taking samples from continuously travelling strip comprising a frame with respect to which said strip has a guided movement over a vertical path, a carriage mounted on said frame for vertical movement along said path, a hoist for raising said carriage to an elevated position including means for releasing it for gravitational downward movement therefrom, a stop for arresting the downward movement of said carriage in a lowered position, a punch and a die respectively disposed on opposite sides of said path of strip travel and mounted on said carriage for movement in a direction transversely of said path between retracted and punching position relative to said strip, said punch and die normally occupying a retracted position relative to each other on said carriage, means for actuating said punch and die to their said strip punching position in response to downward movement of said carriage to a predetermined position between said elevated and lowered positions, and control means regulating the speed of carriage movement and operating to provide a downward speed thereof that matches the speed of strip movement at the time when said punch and die are actuated to their said said strip punching position.

10. A punch for taking samples from continuously travelling strip comprising a frame with respect to which said strip has a guided movement over a vertical path, a carriage mounted on said frame for vertical movement along said path, a hoist for raising said carriage to an elevated position including means for releasing it for gravitational downward movement therefrom, a stop for arresting the downward movement of said carriage in a lowered position, a punch and a die respectively disposed on opposite sides of said path of strip travel and mounted on said carriage for movement in a direction transversely of said path between retracted and punching positions relative to said strip, said punch and die normally occupying a retracted position relative to each other on said carriage, actuating means for moving said punch and said die from said retracted position to said punching position, means for operating said punch and die actuating means in response to gravitational movement of said carriage to a predetermined position between said elevated and lowered positions, and control means regulating the speed of carriage movement and operating to provide a downward speed thereof that matches the speed of strip movement at the time when said punch and die actuating means is operated by said operating means.

11. In a punch for taking samples from continuously travelling strip as it is delivered through a processing line by a strip conveyor, the combination comprising a pair of guide rolls in said conveyor for guiding the movement of the strip over a vertical path, a carriage mounted for guided movement along said path between an elevated position and a lowered position, a hoist for raising said carriage to said elevated position, means for releasing said carriage for gravitational downward movement from said elevated position, a stop for arresting the downward movement of said carriage in said lowered position, a strip punching mechanism mounted on said carriage, means for actuating said punching mechanism to remove a sample from said strip, means responsive to gravitational movement of said carriage to a predetermined position between said elevated and lowered positions for operating said punching mechanism actuating means, and control means regulating the speed of carriage movement and operating to provide a downward speed thereof that matches the speed of strip movement at the time when it reaches said predetermined position.

12. A punch as defined in claim 11 characterized by said control means operating independently of said strip conveyor.

13. In a punch for taking samples from strip being delivered continuously by a strip conveyor through a processing line, the combination comprising a pair of guide rolls in said conveyor for guiding the movement of the strip over a rectilinear path, a carriage movable along said path from a first position in which it is at rest to a second position spaced from said first position in the direction of strip movement, means providing for accelerated movement of said carriage from said first position to said second position, a strip punching mechanism on said carriage, means for actuating said strip punching mechanism to remove a sample from said strip, means responsive to movement of said carriage to a predetermined position between said first and second positions for operating said punching mechanism actuating means, and control means operating independently of said strip conveyor to provide a speed of movement of said carriage that matches the speed of strip movement when said carriage reaches said predetermined position.

14. Strip punching apparatus as defined in claim 13 characterized by said means providing for accelerated movement of said carriage being independent of the operation of said strip conveyor.

References Cited in the file of this patent

UNITED STATES PATENTS

| | | |
|---|---|---|
| 1,990,478 | Fitzgerald | Feb. 12, 1935 |
| 2,350,975 | Rodder et al. | June 6, 1944 |
| 2,519,159 | Talbot | Aug. 15, 1950 |
| 2,854,077 | Novak et al. | Sept. 30, 1958 |
| 2,930,269 | Kennedy | Mar. 29, 1960 |